US005596520A

United States Patent [19]

Hara et al.

[11] Patent Number: 5,596,520
[45] Date of Patent: Jan. 21, 1997

[54] CMOS FULL ADDER CIRCUIT WITH PAIR OF CARRY SIGNAL LINES

[75] Inventors: Hiroyuki Hara, Fujisawa; Takayasu Sakurai, Setagaya-ku, both of Japan

[73] Assignee: Kabushiki Kaisha Toshiba, Tokyo, Japan

[21] Appl. No.: 317,435

[22] Filed: Oct. 4, 1994

[30] Foreign Application Priority Data

Oct. 4, 1993 [JP] Japan ................... 5-248237

[51] Int. Cl.⁶ .............................. G06F 7/50
[52] U.S. Cl. ........................... 364/786; 364/784
[58] Field of Search ................. 364/784, 786

[56] References Cited

U.S. PATENT DOCUMENTS

| 4,357,675 | 11/1982 | Freyman | 364/786 |
| 4,802,112 | 1/1989 | Yoshida et al. | 364/784 |
| 4,807,176 | 2/1989 | Yamada et al. | 364/786 |
| 4,858,167 | 8/1989 | Simpson et al. | 364/787 |

FOREIGN PATENT DOCUMENTS

| 2206831 | 8/1990 | Japan. |
| 2069785 | 2/1980 | United Kingdom. |

| 8504965 | 11/1985 | WIPO. |

*Primary Examiner*—Tan V. Mai
*Attorney, Agent, or Firm*—Loeb & Loeb LLP

[57] ABSTRACT

A full adder circuit has a plurality of full adders each provided for each bit. Each full adder has: a calculation block (31a) responsive to a first carry signal (C) given by a preceding stage bit as a differential signal and two external input data (A1, B1) to be added at a present stage bit, for outputting addition data calculated on the basis of the first carry signal and the external input data as two differential signals, and further outputting a second carry signal (/C) to a succeeding bit as a differential signal indicative of whether a carry is generated by the present stage bit or not. Each full adder also has a latch type sense amplifier (16a) for outputting an addition result (SUM) of the present stage bit, after having differentially amplified and latched the addition data outputted by the calculation block. Since the addition operation is made on the basis of the carry signals (C and /C) of a minute potential difference (before amplification), it is possible to shorten the required charging time and to reduce the current consumption. In addition, since the sense amplifiers (16a) are provided with the latch function (18a), it is possible to control the differential amplification operation and the latch operation on the basis of a common sense amplifier activating signal (SAB), so that the number of elements can be reduced.

11 Claims, 4 Drawing Sheets

FIG. 1

PRIOR ART

CM OS FULL ADDER CIRCUIT WITH PAIR OF CARRY SIGNAL LINES

BACKGROUND OF THE INVENTION

The present invention relates to a full adder circuit, and more specifically to a full adder circuit for transmitting a carry signal differentially from a less significant bit full adder to a more significant bit full adder.

Figure 1:
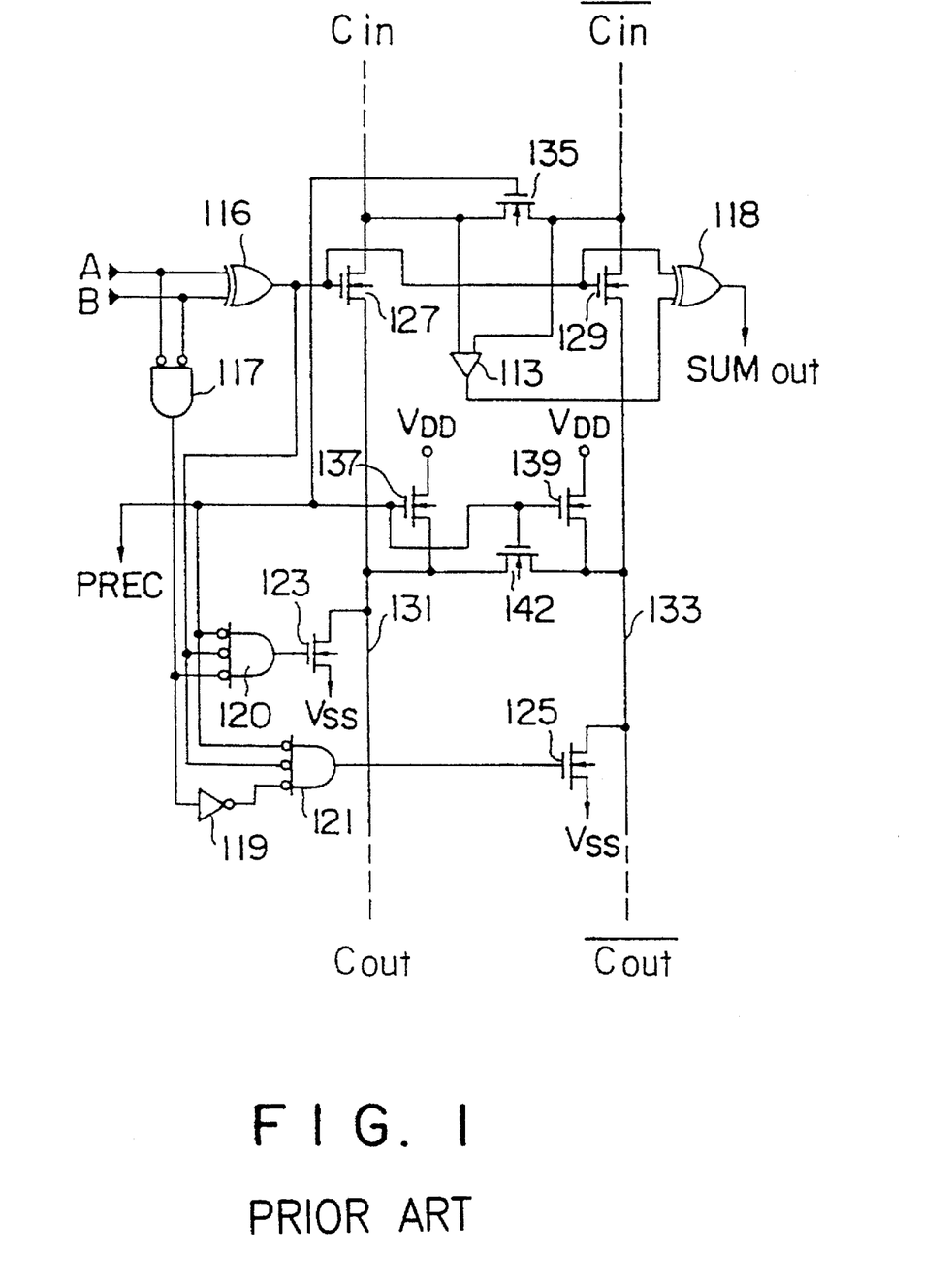
FIG. 1 is a circuit diagram showing a full adder circuit related to the present invention.

FIG. 1 shows an adder circuit related to the present invention, in which two carry signals are inputted from a preceding stage full adder as complementary differential carry signals; addition data is obtained on the basis of the carry signals and data to be added; and the other carry signals are transmitted to a succeeding stage full adder.

In more detail, the complementary carry signals Cin and /Cin are inputted from the preceding stage full adder to the present full adder. In this adder, when the signal level of the carry signal Cin is higher than that of the carry signal /Cin, a carry is not generated to the succeeding stage bit. In contrast with this, when the signal level of the carry signal Cin is lower than that of the carry signal /Cin, a carry is generated to the succeeding stage bit. Between two input terminals for inputting the carry signals C and /C from the preceding stage bit and two output terminals for outputting the carry signals Cout and /Cout to the succeeding stage bit, two signal lines 131 and 133 are connected to transmit the carry signals, respectively. Between the two signal lines 131 and 133, two N-channel transistors 127 and 129 are provided as transfer gates of the signal lines.

Before operation, a precharge signal PREC is inputted to the gates of two N-channel transistors 137 and 139 to turn on these transistors, so that the signal lines 131 and 133 are precharged to a predetermined level. Further, the two signal lines 131 and 133 are equalized to the same potential through an N-channel transistor 142 also turned on in response to the precharge signal PREC. In the same way as above, the precharge signal PREC is inputted to the gate of an N-channel transistor 135 to turn on this transistor, so that the two input terminal for inputting the carry signals Cin and /Cin are equalized to the same potential through this N-channel transistor 135. After that, the transistors 137 and 139 are both turned off to execute the addition operation.

In the present stage bit, two data A and B are added. When both data are at the logical [1] level, a carry must be generated to the succeeding stage bit, irrespective of the carry signals Cin and /Cin applied by the lower significant bit. In this case, an EX-OR circuit 116 (to which two input data A and B are applied) outputs a logical [0] level signal to the gates of the N-channel transistors 127 and 129, so that these transistors are both turned off. As a result, the carry signals Cin and /Cin are both not transmitted to the succeeding stage bit.

The EX-OR circuit 116 and a NAND circuit 117 (to both of which the input data A and B are applied) output both a logical [0] level signal, respectively. These two logical [0] level signal of the circuits 116 and 117 and the logical [0] level signal of the precharge signal PREC are all inputted to a NAND circuit 120, so that the NAND circuit 120 outputs the logical [1] level signal. This signal is given to the gate of an N-channel transistor 123 to turn it on, with the result that the signal line 131 is discharged to a low potential Vss. In contrast with this, a NAND circuit 121 outputs a logical [0] level signal. This signal is given to the gate of an N-channel transistor 125 to turn it off, with the result that the signal line 133 is held at the precharged potential PREC. Therefore, the potential of the signal line 131 becomes lower than that of the signal line 133, so that the potential of the carry signal Cout becomes lower than that of the carry signal /Cout. As a result, a carry is generated to the succeeding stage bit.

On the other hand, when both data are at the logical [0] level, a carry is not generated to the succeeding stage bit, irrespective of the carry signals Cin and /Cin applied by the lower significant bit. In this case, the EX-OR circuit 116 (to which two input data A and B are applied) outputs a logical [0] level signal to the gates of the N-channel transistors 127 and 129, so that these transistors are both turned off. As a result, the carry signals Cin and /Cin are both not transmitted to the succeeding stage bit.

The EX-OR circuit 116 (to which the input data A and B are applied) outputs the logical [0] level signal. The NAND circuit 117 (to which the input data A and B are applied in the same way) outputs the logical [1] level signal. This signal is inverted to the logical [0] level signal by an inverter 119. These two logical [0] level signals of the circuits 116 and 117 and the logical [0] level signal of the precharge signal PREC are all inputted to the NAND circuit 121, so that the NAND circuit 121 outputs the logical [1] level signal. This signal is given to the gate of the N-channel transistor 125 to turn it on, with the result that the signal line 133 is discharged to a low potential Vss. In contrast with this, the NAND circuit 120 outputs a logical [0] level signal. This signal is given to the gate of the N-channel transistor 123 to turn it off, with the result that the signal line 133 is held at the precharged potential PREC. Therefore, the potential of the signal line 131 becomes higher than that of the signal line 133, so that the potential of the carry signal Cout becomes higher than that of the carry signal /Cout. As a result, a carry is not generated to the succeeding stage bit.

When the input data A and B are at the logical [0] level and [1] level, respectively or at the logical [1] level and [0] level, respectively, the carry signals Cin and /Cin applied by the less significant bit decide whether a carry must be generated or not to the succeeding stage bit. When the input data A and B are inputted to the EX-OR circuit 116, the logical [1] level signal is inputted to the gates of the N-channel transistors 127 and 129 to turn them on, respectively. Further, the logical [0] level signal is outputted from the two NAND circuits 120 and 121 to turn off both the N-channel transistors 123 and 125, respectively. As a result, the carry signals Cin and /Cin from the preceding stage bit are outputted, as they are, to the succeeding stage bit as the carry signals Cout and /Cout.

Further, the bits are added as follows: the output result of the EX-OR circuit 116 for inputting input data A and B and the amplified result of the preceding stage carry signal Cin and /Cin by a sense amplifier 113 are both inputted to an EX-OR circuit 118, and the logical operation result thereof is outputted to the outside as an addition data signal SUM OUT.

In the circuit shown in FIG. 1, the carry signals Cin and /Cin inputted from the preceding stage bit are minute-level differential signals and therefore the potential difference between the two is small. After having been amplified by the sense amplifier 113, a differential signal between the two signals Cin and /Cin are inputted to the EX-OR circuit 118 together with the input data A and B. In other words, the addition result can be obtained on the basis of the differential signal with a large amplitude amplified by the sense amplifier 113, without use of the minute-amplitude differential carry signals Cin and /Cin. Accordingly, there exists such a problem in that it takes time to charge and discharge the signal amplified by the sense amplifier, so that the operational speed decreases and simultaneously the current consumption increases.

In addition, the addition data signal SUM OUT outputted by EX-OR circuit 118 must be latched by a latch circuit (not shown) connected to an output terminal of the EX-OR circuit 118. Since this latch circuit is provided separately from the sense amplifier 113, another signal for deciding the latch timing is additionally required, thus causing another problem in that the number of the elements inevitably increases.

SUMMARY OF THE INVENTION

Accordingly, it is the object of the present invention to provide a full adder circuit which can increase the operational speed, decrease the current consumption, and further reduce the number of elements.

To achieve the above-mentioned object, the present invention provides a full adder circuit having a plurality of full adders each provided for each bit, each full adder comprising: a calculation block responsive to a first carry signal given by a preceding stage bit as a differential signal and two external input data to be added at a present stage bit, for outputting addition data calculated on the basis of the first carry signal and the external input data as two differential signals, and further outputting a second carry signal to a succeeding bit as a differential signal indicative of whether a carry is generated by the present stage bit or not; and a latch type sense amplifier for outputting an addition result of the present stage bit, after having differentially amplified and latched the addition data outputted by said calculation block.

When the addition is executed on the basis of the differential carry signals of large level difference obtained after having been sense-amplified as with the case of the above mentioned circuit related to the present invention, a long charging time and a large current consumption are required. In the present invention, however, since the addition is executed by the calculating block on the basis of the differential carry signals of minute level difference obtained before amplified by the sense amplifier, it is possible to increase the operational speed and decrease the current consumption. Further, since the addition result is amplified and further latched by the latch type sense amplifier, it is possible to reduce the number of the required elements, as compared to the case when the addition calculation is executed on the basis of the signals amplified by the sense amplifier and further the calculated result is latched by another latch circuit provided separately from the sense amplifier.

DETAILED DESCRIPTION OF THE EMBODIMENTS

An embodiment of the full adder circuit according to the present invention will be described hereinbelow with reference to the attached drawings.

Figure 2:
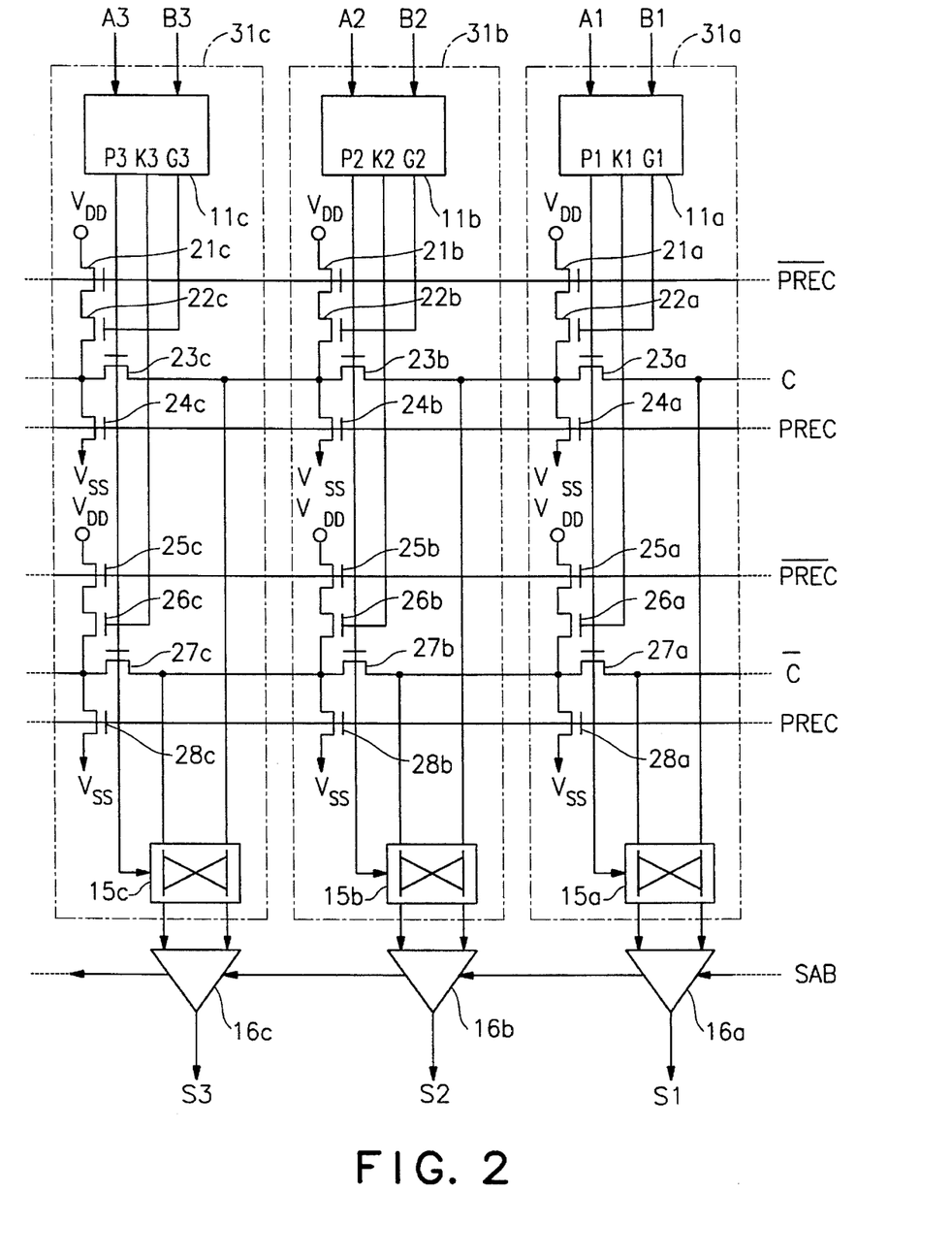
FIG. 2 is a circuit diagram showing an embodiment of the full adder circuit according to the present invention.

FIG. 2 shows a 3-bit full adder circuit of the present invention. A full adder circuit is composed of three calculation blocks 31a, 31b and 31c for obtaining an addition data and carry signals C and /C to be outputted to the succeeding stage bit, for each bit. To each calculation block 31a, 31b, or 31c, input data A1 and B1, A2 and B2, or A3 and B3 and carry signals C and /C of the preceding stage bit are inputted.

Further, each calculation block 31a (as an example of three blocks) is composed of an input block 11a; two N-channel transistors 21a and 22a for charging a signal line 31 for transmitting the carry signal C from the preceding stage bit to the succeeding stage bit; an N-channel transistor 23a (as a transfer gate) for activating or deactivating the signal line 31; an N-channel transistor 24a for charging the signal line 31; two N-channel transistors 25a and 26a for charging a signal line 32 for transmitting the carry signal /C from the preceding stage bit to the succeeding stage bit; an N-channel transistor 27a (as a transfer gate) for activating or deactivating the signal line 32; an N-channel transistor 28a for discharging the signal line 32; and a switching circuit 15a for executing EX-OR operation on the basis of a control signal P1 and carry signals C and /C (described later).

The input block 11a inputs the input data A1 and B1 (as described later), and generates control signals P1, K1 and G1, respectively. The operation of the transistors 23a and 27a is controlled on the basis of this control signal P1, respectively.

The N-channel transistor 21a is operated in response to a precharge signal /PREC applied to the gate thereof, and the N-channel transistor 22a is controlled in response to a control signal G1 outputted from the input block 11a to the gate thereof.

The N-channel transistor 24a is operated in response to a precharge signal PREC applied to the gate thereof.

The N-channel transistor 25a is operated in response to a precharge signal /PREC applied to the gate thereof, and the N-channel transistor 26a is controlled in response to a control signal K1 outputted from the input block 11a to the gate thereof.

The N-channel transistor 28a is operated in response to a precharge signal PREC applied to the gate thereof.

The switching circuit 15a switches the outputs of the carry signals C and /C on the basis of the control signal P1 given by the input block 11a, as described above, and executes EX-OR operation necessary for addition operation. The output of the switching circuit 15a corresponds to the addition data of the present bit. This addition data is a differential signal having a minute potential difference. This signal is inputted to a latch type sense amplifier 16a, differentially amplified to a necessary level, and then outputted as an addition data signal S1. Further, this latch type sense amplifier 16a is also provided with such a function as to latch the addition data signal S1 in response to the sense amplifier activation signal SAB.

Other calculation blocks 31b and 31c are basically the same as the calculation block 31a described above, so that any detailed description thereof is omitted herein.

The operation of the calculation block 31a and the latch type sense amplifier 16a shown in FIG. 2 will be described hereinbelow.

Prior to the addition operation of each bit, the signal lines 31 and 32 for transmitting the carry signals C and /C are precharged. The precharge signal PREC is set to the logical [1] level, and the signal lines 31 and 32 are both discharged to the logical [0] level. After precharge, the precharge signal PREC is set to the logical [0] level, and the precharge signal/PREC is set to the logical [1] level.

Figure 3:
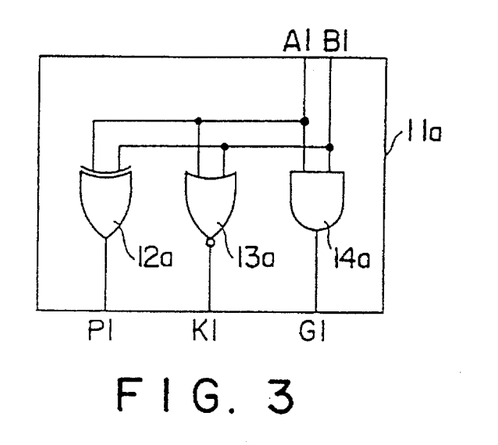
FIG. 3 is a circuit diagram showing an input block structure of the full adder circuit shown in FIG. 2.

Here, the input data A1 and B1 are inputted to the input block 11a. FIG. 3 shows the circuit construction of this input block 11a. In FIG. 3, input data A1 and B1 are inputted to an EX-OR circuit 12a, a NOR circuit 13a, and an AND circuit 14a, respectively, to output the control signals P1, K1 and G1, respectively.

In the case where the input data A1 and B1 are at the logical [1] level and [0] level, respectively or at the logical [0] level and [1] level, respectively, the logical [1] level control signal P1 is outputted by only the EX-OR circuit 12a. Therefore, the N-channel transistors 23a and 27a are turned on, so that the carry signals C and /C transmitted from the preceding stage bit are transmitted, as they are, to the succeeding stage bit through the signal lines 31 and 32, respectively.

When the input data A1 and B1 are both at the logical [1] level, it is necessary to generate a carry to the succeeding stage bit, irrespective of the carry signals C and /C of the preceding stage bit. In this case, only the AND circuit 14a outputs the logical [1] level control signal G1. This control signal G1 is inputted to the gate of the N-channel transistor 22a to turn it on, so that the signal line 31 is charged in cooperation with the N-channel transistor 21a turned on in response to the logical [1] level precharge signal/PREC applied to the gate thereof. Since the N-channel transistor 26a is turned off by the logical [0] level control signal K1, the signal line 32 is not charged. Accordingly, the level of the carry signal C is higher than that of the carry signal /C. As a result, the carry signals C and /C indicative of a carry are outputted to the succeeding stage bit. When the input data A1 and B1 are both at the logical [0] level, a carry is not generated, irrespective of the carry signals C and /C of the preceding stage bit. In this case, only the NOR circuit 13a outputs the logical [1] level control signal K1. This control signal K1 is inputted to the gate of the N-channel transistor 26a to turn it on, so that the signal line 32 is charged in cooperation with the N-channel transistor 25a turned on in response to the logical [1] level precharge signal/PREC applied to the gate thereof. Since the N-channel transistor 22a is turned off by the logical [0] level control signal G1, the signal line 31 is not charged. Accordingly, the level of the carry signal /C is higher than that of the carry signal C.

As a result, the carry signals C and /C indicative of no carry are outputted to the succeeding stage bit.

The same operation as above is executed in the other calculation blocks 31b and 31c, respectively.

Here, it is necessary to determine the sizes of the N-channel transistors 21a to 21c, 22a to 22c, 23a to 23c, 24a to 24c all connected to the signal line 31, and the sizes of the N-channel transistors 25a to 25c, 26a to 26c, 27a to 27c, 28a to 28c all connected to the signal line 32, under consideration of the following points:

In the case of the signal line 31, for example, the level of the carry signal C transmitted to the signal line 31 is minimized when the carry signal C generated and outputted by the least significant bit is transmitted to the most significant bit via all the N-channel transistors 23a, 23b, 23c, . . . Therefore, it is necessary to determine the dimensions of the transistors 21a to 21c, 22a to 22c, 23a to 23c, so that the carry signal of the minimum level can be sensed by the sense amplifier for the least significant bit (in other words, the sizes of the transistors must be large enough to transmit the carry signal without excessively reducing the potential level of the carry signal). These transistor dimensions are related to the required operational speed. That is, when a high speed operation is required, the carry signal must be sensed at early timing in the process during which the signal line 31 is charged by the transistors 21a to 21c and 22a to 22c and thereby the potential thereat increases. Therefore, it is necessary to determine the dimensions of the transistors to be large enough. Further, the size of the transistor 24a must be determined in such a way that the precharge can be completed within the precharge cycle.

Figure 4:
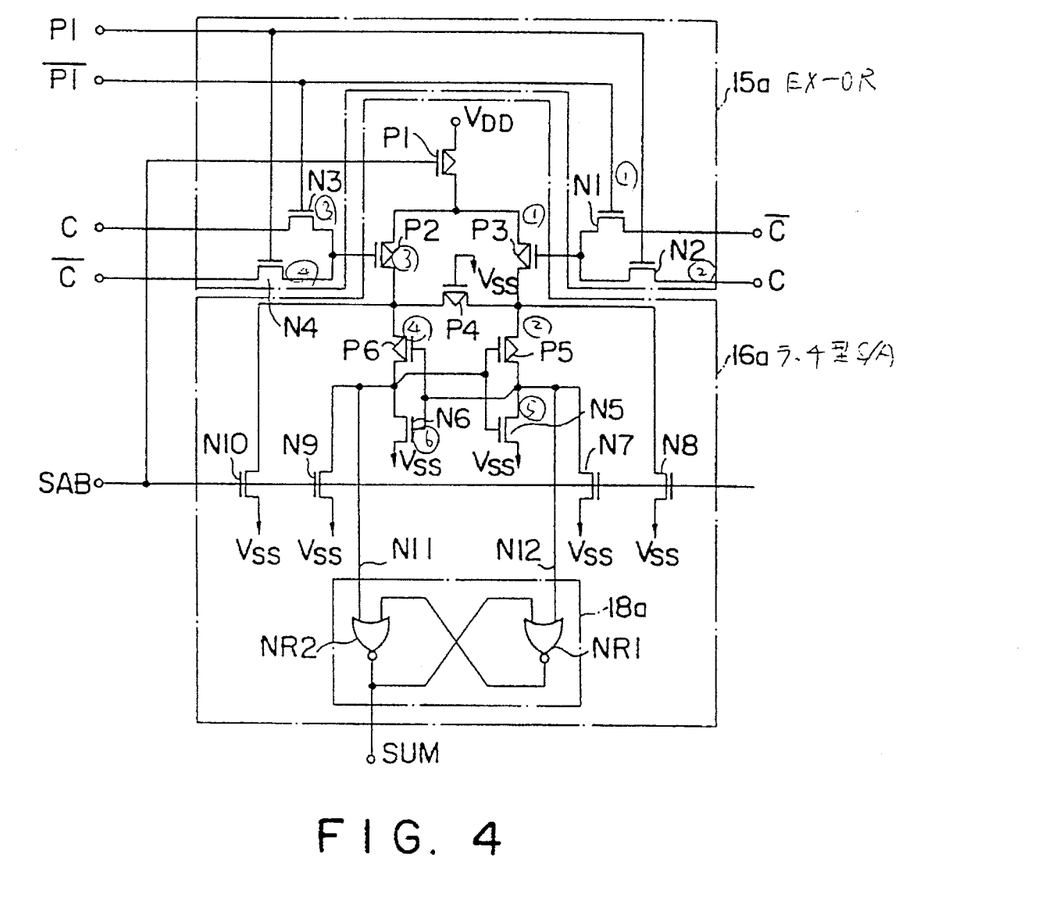
FIG. 4 is a circuit diagram showing a switching circuit and a latch type sense amplifier circuit of the full adder circuit shown in FIG. 2.

Here, the operation of the carry signals C and /C whose levels have been decided, the switching circuit 15a for executing the EX-OR operation on the basis of the control signal P outputted by the input block 11a, and the latch type sense amplifier 16a will be described hereinbelow. The switching circuit 15a and the latch type sense amplifier 16a are constructed as shown in FIG. 4.

The switching circuit 15a is composed of N-channel transistors N1 and N3 to each gate of which the control signal /P1 is inputted, and N-channel transistors N2 and N4 to each gate of which the control signal P1 is inputted. The carry signal /C is inputted to one end of the N-channel transistor N1, and the carry signal C is inputted to one end of the N-channel transistor N2. The other ends of both the N-channel transistors N1 and N2 are connected to the gate of a P-channel transistor P3 of the latch type sense amplifier 16a. In the same way as above, the carry signal C is inputted to one end of the N-channel transistor N3, and the carry signal /C is inputted to one end of the N-channel transistor N4. The other ends of both the N-channel transistors N3 and N4 are connected to the gate of a P-channel transistor P2 of the latch type sense amplifier 16a. When the control signal P1 is at the logical [1] level, (the signal /P is at the logical [0] level), the N-channel transistors N2 and N4 are both turned on. Therefore, the carry signal C is inputted to the gate of the P-channel transistor P3, and the carry signal /C is inputted to the gate of the P-channel transistor P2. In contrast with this, when the control signal P1 is at the logical [0] level, (the signal /P is at the logical [1] level), since the input conditions are switched, the carry signal /C is inputted to the gate of the P-channel transistor P3, and the carry signal C is inputted to the gate of the P-channel transistor P2.

The latch type sense amplifier 16a is provided with P-channel transistors P1 to P6, a current mirror type differential amplifier circuit composed of N-channel transistors N5 to N10, and a latch circuit 18a composed of two NOR circuits NR1 and NR2. The latch type sense amplifier 16a operates on the basis of the sense amplifier activating signal SAB inputted to the gate of the N-channel transistors N7 to N10. In other words, when the signal SAB is at the logical [1] level, the precharge is executed, so that the N-channel transistors N7 to N10 are turned on and thereby nodes N11 and N12 corresponding to the output terminals of the differential amplifier circuit are fixed to a ground potential Vss. When the signal SAB changes to the logical [0] level, since the N-channel transistors N7 to N10 are all turned off, the sensing operation and the latch operation are both executed.

The carry signals C and /C are inputted from the switching circuit 15a to the latch type sense amplifier 16a, and then amplified differentially to decide both the levels of the output nodes Nil and N12. These levels at the output nodes N11 and N12 are inputted to the latch circuit 18a, so that the addition data signal SUM can be outputted through an output terminal of the latch circuit 18a.

When the control signal P1 is at the logical [1] level (the signal /P1 is at the logical [0] level), the carry signal C is inputted to the gate of the P-channel transistor P3, and the signal /P is inputted to the gate of the P-channel transistor P2. Here, if the carry signal C is at the logical [1] level, (the signal /C is at the logical [0] level), the P-channel transistor P3 is turned off and the P-channel transistor P2 is turned on. In this case, the P-channel transistor P6 and N-channel transistor N5 are turned on, and the P-channel transistor P5 and N-channel transistor N6 are turned off. As a result, the output node N12 is at the logical [0] level and the output node N11 is at the logical [1] level, so that latch circuit 18a outputs a logical [0] level addition data signal SUM.

Figure 5:
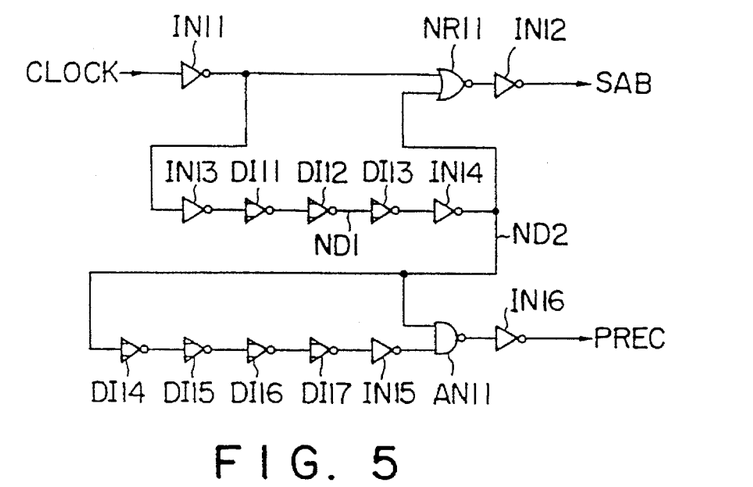
FIG. 5 is a circuit diagram showing an example of a circuit for generating control signals used for the full adder circuit shown in FIG. 2.

Here, the sense amplifier activating signal SAB and the precharge signal PREC are both generated by a clock signal CLOCK. FIG. 5 shows an example of the circuit for generating the sense amplifier activating signal SAB and the precharge signal PREC on the basis of the clock signal CLOCK. The circuit is composed of inverters IN11 to IN16, delay inverters DI11 to DI17, a NOR circuit NR11 and an AND circuit AN11.

Figure 6:
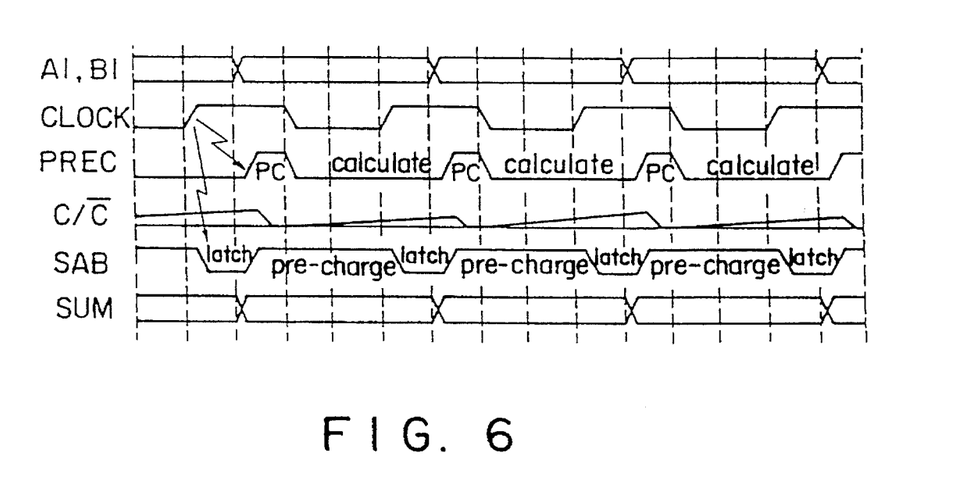
FIG. 6 is a timing chart showing the waveforms of various signals of the full adder circuit shown in FIG. 2.

Further, FIG. 6 shows a timing chart of the sense amplifier activating signal SAB and the precharge signal PREC both generated by the circuit shown in FIG. 5 in response to the clock signal CLOCK. Further, FIG. 6 shows the respective levels of the input data A1 and B1, the carry signals C and /C, and the addition data signal SUM, respectively.

With reference to FIG. 6, when the clock signal CLOCK rises, the precharge signal PREC also rises, so that the signal lines 31 and 32 are both precharged to ground potential Vss in FIG. 2. After that, when the precharge signal PREC falls, the difference between the two carry signals C and /C is calculated. Therefore, the relative potential difference between the two carry signals C and /C transmitted through the two signal lines 31 and 32 increases gradually as shown in FIG. 6.

In the succeeding cycle, when the clock CLOCK rises and the precharge signal PREC falls, the signal lines 31 and 32 are precharged again. At this time, the carry signals C and /C obtained by simultaneous calculation are inputted to the latch type sense amplifier 16a via the switching circuit 15a.

At the timing when the clock signal CLOCK rises and further the sense amplifier activating signal SAB drops to the logical [0] level, the latch type sense amplifier 16a amplifies the two inputted carry signals C and /C and latches the amplified signals. After the addition data SUM has been latched, the sense amplifier activating signal SAB rises to the logical [1] level, so that the latch type sense amplifier 16a is precharged. Further, the precharge signal PREC changes to the logical [1] level to precharge the signal lines 31 and 32, for the succeeding calculation.

In the embodiment as described above, the following effects can be obtained: In the circuit as shown in FIG. 1, after the minute differential carry signals C and /C have been amplified by the sense amplifier 113 to obtain a differential signal with a large level difference between the two, the differential carry signal is applied from the sense amplifier 113 to the EX-OR circuit 118 for addition operation. Therefore, a relatively long charge time is required and a relatively large current is consumed. In addition, the circuit for latching the addition result is provided separately from the sense amplifier, so that the number of the elements is large.

In contrast with this, in the circuit as shown in FIG. 2, the addition operation is executed by use of the carry signals C and /C of small difference level (before being amplified by the latch type sense amplifiers 16a to 16c). After that, the addition data outputted by the switching circuits 15a to 15c are inputted to the latch type sense amplifiers 16a to 16c to amplify the level thereof up to a required level. As described above, in the circuit according to the present invention, since the addition operation is made on the basis of the carry signals C and /C of a minute potential difference (obtained before being amplified by the sense amplifier), it is possible to shorten the required charging time and to reduce the current consumption. In addition, since the sense amplifiers 16a to 16c are provided with the latch function, respectively, it is possible to control the differential amplification operation and the latch operation on the basis of the common signal SAB, so that the number of elements can be reduced.

The embodiment of the full adder circuit according to the present invention has been explained only by way of example. That is, the circuits shown in FIGS. 2 to 5 are explained by way of examples, so that various modifications can be made without being limited to only those shown.

Further, in the timing chart shown in FIG. 6, the timing is so determined that after the latch operation of the latch type sense amplifiers 15a to 15c has been completed on the basis of the sense amplifier activating signal SAB, the signal lines 31 and 32 are precharged on the basis of the precharge signal PREC. However, when a higher speed operation is needed, it is also possible to start the precharge operation for the signal lines 31 and 32, before the latch operation of the latch type sense amplifiers 15a to 15c ends completely. In this case, in FIG. 5, for instance, the node ND2 connected to the output terminal of the inverter IN14 is connected to the output terminal of the delay inverter DI12. By this connection, the precharge signal PREC can rise, before the sense amplifier activating signal SAB rises.

What is claimed is:

1. A full adder circuit having a plurality of full adders each provided for each bit, the full adder circuit comprising:

a calculation block for receiving a carry-in signal and an inverted carry-in signal from a preceding stage bit as differential signals and two external input data to be added at a present stage bit, for outputting addition data and inverted addition data as differential signals calculated on the basis of the carry-in signal, the inverted carry-in signal and the external input data, and further outputting a carry-out signal and an inverted carry-out signal as differential signals to a succeeding stage bit, the calculation block including, an input block coupled to the external input data, which generates first and second control signals, a pair of carry signal lines provided between respective full adders, for receiving the carry-in signal and the inverted carry-in signal from the preceding stage bit to apply the carry-in signal from the preceding stage bit to the present stage bit and for transferring the carry-out signal and the inverted carry-out signal generated at the present stage bit to the succeeding stage bit, precharging means, responsive to external precharge signals, for precharging the pair of carry signal lines to a predetermined potential, carry-out and inverted carry-out signals generating means, responsive to the first control signal, for generating the carry-out signal and the inverted carry-out signal after the pair of carry signal lines have been precharged, transfer gate means, responsive to the second control signal, for transferring the carry-in signal and the inverted carry-in signal to the succeeding stage bit as the carry-out signal and the inverted carry-out signal, and a switching circuit, responsive to the second control signal, the carry-in signal and the inverted carry-in signal, to switch the outputs of the carry-in signal and the inverted carry-in signal on the basis of the second control signal, to produce the addition data and the inverted addition data; and a latch type sense amplifier for receiving the addition data and the inverted addition data from the switching circuit, differentially amplifying and latching the addition data and the inverted addition data, and for outputting an addition result of the present stage bit.

2. The full adder circuit of claim 1, wherein said input block applies, when the external input data do not match in logical level, the second control signal to said transfer gate means to place the pair of carry signal lines into a conductive state;

when the input data are both at a first logical level, the second control signal to said transfer gate means to place the pair of carry signal lines into a non-conductive state, and further applies the first control signal to the carry-out and inverted carry-out signals generating means to set the carry-out signal to the first logical level; and when the input data are both at a second logical level, the second control signal to said transfer gate to turn off the pair of carry signal lines, and further applies the first control signal to the carry-out and inverted carry-out signals generating means so that the carry-out signal is set to the second logical level, wherein said switching circuit performs an exclusive OR operation by switching a relative potential difference between said pair of carry signal lines according to the external input data, and applies the calculation result to said latch type sense amplifier as the addition data and the inverted addition data.

3. The full adder circuit of claim 1, wherein said input block comprises:

an AND circuit and a NOR circuit responsive to the external input data, for executing a logical sum operation and a logical product operation to output the first control signal as the differential signals; and an EX-OR circuit, responsive to the external input data, for executing exclusive an logical sum operation to output the second control signal, wherein the carry-out and inverted carry-out signals generating means comprises a first charging transistor coupled to the carry-out signal and a second charging transistor coupled to the inverted carry-out signal, wherein the first charging transistor is responsive to said AND circuit and the second charging transistor is responsive to the NOR circuit to control charging of said pair of carry signal lines; and wherein said transfer gate means comprises a gate transistor provided for each one of said pair of carry signal lines, wherein each gate transistor is responsive to the second control signal produced by said EX-OR circuit for controlling turn-on or turn-off operation of said transfer gate means.

4. The full adder circuit of claim 3, wherein the sizes of the first and the second charging transistors of the carry-out and inverted carry-out signals generating means and the sizes of the gate transistors of said transfer gate means are determined to allow the latch type sense amplifier of the least significant bit stage to sense the carry-in signal and the inverted carry-in signal of the least significant bit stage when the carry-in signal and the inverted carry-in signal generated by the least significant bit stage are transferred to the most significant bit with no change to the logical level.

5. The full adder circuit of claim 1, wherein said latch type sense amplifier comprises:

a current mirror type differential amplifier circuit, responsive to a sense amplifier activating signal, for differentially amplifying the addition data and outputting the addition result of the present stage bit; and a latch circuit, responsive to the sense amplifier activating signal, for latching the outputted addition result.

6. The full adder circuit of claim 1, wherein the switching circuit comprises:

a first N-channel transistor including a first gate, a first drain and a first source, wherein the first drain is coupled to the inverted carry-in signal and the first gate is coupled to an inverted second control signal, a second N-channel transistor including a second gate, a second drain and a second source, wherein the second drain is coupled to the carry-in signal, the second gate is coupled to the second control signal, and the second source is coupled to the first source of the first N-channel transistor, a third N-channel transistor including a third gate, a third drain and a third source, wherein the third drain is coupled to the carry-in signal and the third gate is coupled to the inverted second control signal, and a fourth N-channel transistor including a fourth gate, fourth drain and a fourth source, wherein the fourth drain is coupled to the inverted carry-in signal, the fourth gate is coupled to the second control signal, and the fourth source is coupled to the third source of the third N-channel transistor; and the latch type sense amplifier comprises a first P-channel transistor including a first P-channel gate, a first P-channel source and a first P-channel drain, a second P-channel transistor including a second P-channel gate, a second P-channel source and a second P-channel drain, a fifth N-channel transistor including a fitch gate, a filth source and a fifth drain, wherein the first P-channel transistor, the second P-channel transistor and the fifth N-channel transistor are connected in series, a third P-channel transistor including a third P-channel gate, a third P-channel source and a third P-channel drain, a fourth P-channel transistor including a fourth P-channel gate, a fourth P-channel source and a fourth P-channel drain, a sixth N-channel transistor including a sixth gate, a sixth source and a sixth drain, wherein the third P-channel transistor, the fourth P-channel transistor and the sixth N-channel transistor are connected in series, wherein the first P-channel gate of the first P-channel transistor is connected to the first source of the first N-channel transistors, the third P-channel gate of the third P-channel transistor is connected to the third source of the third N-channel transistors, the second P-channel gate of the second P-channel transistor and the fifth gate or the fifth N-channel transistor are connected to the fourth P-channel drain of the fourth P-channel transistor and the sixth source of the sixth N-channel transistor the fourth P-channel gate of the fourth P-channel transistor and the sixth gate of the sixth N-channel transistor are connected to the second P-channel drain of the second P-channel transistor and the fifth source of the fifth N-channel transistor, and a latch circuit including first input signal, second input signal and an output end, the first input signal coupled to the second P-channel drain of the second P-channel transistor, the second input signal coupled to the fourth P-channel drain of the fourth P-channel transistor, wherein the output end produces the addition result of the present stage bit.

7. A full adder operable with a first input signal and a second input signal which represent external input data, a first carry-in signal and a first inverse carry-in signal from a preceding stage bit, and a precharging signal, the full adder comprising:

an input circuit coupled to the first input signal and the second input signal for generating a first control signal and a second control signal;

a pair of carry signal lines for receiving the carry-in signal and the inverted carry-in signal generated at the preceding stage bit and for transferring the carry-out signal and the inverted carry-out signal;

precharging means, responsive to external precharge signals, for precharging the pair of carry signal lines to a predetermined potential;

a carry-out and inverted carry-out signals generating circuit, responsive to the first control signal, for generating the carry-out signal and the inverted carry-out signal after the pair of carry signal lines have been precharged;

a transfer gate circuit, responsive to the second control signal, for transferring the carry-in signal and the inverted carry-in signal as the carry-out signal and the inverted carry-out signal;

a switching circuit responsive to the second control signal, the carry-in signal and the inverted carry-in signal for switching outputs of the carry-in signal and the inverted carry-in signal on the basis of the second control signal, to produce an addition data signal and an inverted addition data signal; and a latch type sense amplifier for receiving the addition data signal and the inverted addition data signal from the switching circuit, differentially amplifying and latching the addition data signal and the inverted addition data signal to output a sum result signal.

8. A full adder circuit having a plurality of full adders each provided for each bit, the full adder circuit comprising:

a calculation block for receiving a carry-in signal and an inverted carry-in signal from a preceding stage bit as differential signals and two external input data to be added at a present stage bit, for outputting addition data and inverted addition data as differential signals calculated on the basis of the carry-in signal, the inverted carry-in signal and the external input data, and further outputting a carry-out signal and an inverted carry-out signal as differential signals to a succeeding stage bit, the calculation block including, an input block coupled to the external input data, which generates first and second control signals, a pair of carry signal lines provided between respective full adders for receiving the carry-in signal and the inverted carry-in signal from the preceding stage bit to apply the carry-in signal from the preceding stage bit to the present stage bit and for transferring the carry-out signal and the inverted carry-out signal generated at the present stage bit to the succeeding stage bit, precharging means, responsive to external precharge signals, for precharging the pair of carry signal lines to a predetermined potential, carry-out and inverted carry-out signals generating means, responsive to the first control signal, for generating the carry-out signal and the inverted carry-out signal after the pair of carry signal lines have been precharged, transfer gate means, responsive to the second control signal, for transferring the carry-in signal and the inverted carry-in signal to the succeeding stage bit as the carry-out signal and the inverted carry-out signal, and a switching circuit, responsive to the second control signal, the carry-in signal and the inverted carry-in signal, to switch the outputs of the carry-in signal and the inverted carry-in signal on the basis of the second control signal to produce the addition data and the inverted addition data; and a latch type sense amplifier for receiving the addition data and the inverted addition data from the switching circuit, differentially amplifying and latching the addition data and the inverted addition data, and for outputting an addition result of the present stage bit, wherein said input block applies, when the external input data do not match in logical level, the second control signal to said transfer gate means to place the pair of carry signal lines into a conductive state;

when the input data are both at a first logical level, the second control signal to said transfer gate means to place the pair of carry signal lines into a nonconductive state, and further applies the first control signal to the carry-out and inverted carry-out signals generating means to set the carry-out signal to the first logical level; and when the input data are both at a second logical level, the second control signal to said transfer gate to turn off the pair of carry, signal lines, and further applies the first control signal to the carry-out and inverted carry-out signals generating means so that the carry-out signal is set to the second logical level, wherein said switching circuit performs exclusive OR operation by switching a relative potential difference between said pair of carry signal lines according to the external input data, and applies the calculation result to said latch type sense amplifier as the addition data and the inverted addition data.

9. A full adder circuit having a plurality of full adders each provided for each bit, the full adder circuit comprising:

a calculation block for receiving a carry-in signal and an inverted carry-in signal from a preceding stage bit as differential signals and two external input data to be added at a present stage bit, for outputting addition data and inverted addition data as differential signals calculated on the basis of the carry-in signal, the inverted carry-in signal and the external input data, and further outputting a carry-out signal and an inverted carry-out signal as differential signals to a succeeding stage bit, the calculation block including, an input block coupled to the external input data, which generates first and second control signals, a pair of carry signal lines provided between respective full adders for receiving the carry-in signal and the inverted carry-in signal from the preceding stage bit to apply the carry-in signal from the preceding stage bit to the present stage bit and for transferring the carry-out signal and the inverted carry-out signal generated at the present stage bit to the succeeding stage bit, precharging means, responsive to external precharge signals, for precharging the pair of carry, signal lines to a predetermined potential, carry-out and inverted carry-out signals generating means, responsive to the first control signal, for generating the carry-out signal and the inverted carry-out signal after the pair of carry signal lines have been precharged, transfer gate means, responsive to the second control signal, for transferring the carry-in signal and the inverted carry-in signal to the succeeding stage bit as the carry-out signal and the inverted carry-out signal, and a switching circuit, responsive to the second control signal, the carry-in signal and the inverted carry-in signal, to switch the outputs of the carry-in signal and the inverted carry-in signal on the basis of the second control signal, to produce the addition data and the inverted addition data; and a latch type sense amplifier for receiving the addition data and the inverted addition data from the switching circuit, differentially amplifying and latching the addition data and the inverted addition data, and for outputting an addition result of the present stage bit, wherein said input block comprises an AND circuit and a NOR circuit, responsive to the external input data, for executing logical sum operation and logical product operation to output the first control signal as the differential signals; and an EX-OR circuit responsible to the external input data, for executing exclusive logical sum operation to output the second control signal, wherein the carry-out and inverted carry-out signals generating means comprises a first charging transistor coupled to the carry-out signal and a second charging transistor coupled to the inverted carry-out signal, wherein the first charging transistor is responsive to said AND circuit and the second charging transistor is responsive to the NOR circuit to control charging operation of said pair of carry signal lines; and wherein said transfer gate means comprises a gate transistor provided for each one of said pair of carry signal lines, wherein each gate transistor is responsive to the second control signal produced by said EX-OR circuit for controlling turn-on or turn-off operation of said transfer gate means.

10. The full adder circuit of claim 9, wherein the sizes of the first and the second charging transistors of the carry-out and inverted carry-out signals generating means and the sizes of the gate transistors of said transfer gate means are determined to allow the latch type sense amplifier of the least significant bit stage to sense the carry-in signal and the inverted carry-in signal of the least significant bit stage when the carry-in signal and the inverted carry-in signal generated by the least significant bit stage are transferred to the most significant bit with no change to the logical level.

11. A full adder circuit having a plurality of full adders each provided for each bit, the full adder circuit comprising:

a calculation block for receiving a carry-in signal and an inverted carry-in signal from a preceding stage bit as differential signals and two external input data to be added at a present stage bit, for outputting addition data and inverted addition data as differential signals calculated on the basis of the carry-in signal, the inverted carry-in signal and the external input data, and further outputting a carry-out signal and an inverted carry-out signal as differential signals to a succeeding stage bit, the calculation block including, an input block coupled to tile external input data, which generates first and second control signals, a pair of carry signal lines, provided between respective full adders, for receiving the carry-in signal and the inverted carry-in signal from the preceding stage bit to apply the carry-in signal from the preceding stage bit to the present stage bit and for transferring the carry-out signal and tile inverted carry-out signal generated at the present stage bit to the succeeding stage bit, precharging means, responsive to external precharge signals, for precharging the pair of carry signal lines to a predetermined potential, carry-out and inverted carry-out signals generating means, responsive to the first control signal, for generating the carry-out signal and the inverted carry-out signal after the pair of carry signal lines have been precharged, transfer gate means, responsive to the second control signal, for transferring the carry-in signal and the inverted carry-in signal to the succeeding stage bit as the carry-out signal and the inverted carry-out signal, and a switching circuit, responsive to the second control signal, the carry-in signal and the inverted carry-in signal, to switch the outputs of the carry-in signal and the inverted carry-in signal on the basis of the second control signal, to produce the addition data and the inverted addition data; and a latch type sense amplifier for receiving the addition data and the inverted addition data from the switching circuit, differentially amplifying and latching the addition data and the inverted addition data, and for outputting an addition result of the present stage bit, wherein said latch type sense amplifier comprises a current mirror type differential amplifier circuit, responsive to a sense amplifier activating signal, for differentially amplifying the addition data and outputting the addition result of the present stage bit; and a latch circuit responsive to the sense amplifier activating signal, for latching the outputted addition result.

* * * * *